United States Patent
Russell et al.

(10) Patent No.: US 7,506,659 B2
(45) Date of Patent: Mar. 24, 2009

(54) SYSTEM FOR LIQUID REMOVAL IN A VACUUM ENVIRONMENT

(75) Inventors: Steven L. Russell, Joplin, MO (US); Matthew J. Burinskas, Butler, AL (US)

(73) Assignee: Tamko Roofing Products, Inc., Joplin, MO (US)

( * ) Notice: Subject to any disclaimer, the term of this patent is extended or adjusted under 35 U.S.C. 154(b) by 355 days.

(21) Appl. No.: 11/230,122

(22) Filed: Sep. 19, 2005

(65) Prior Publication Data

US 2007/0062578 A1    Mar. 22, 2007

(51) Int. Cl.
*F16T 1/34* (2006.01)
(52) U.S. Cl. .................. 137/177; 137/205; 137/209
(58) Field of Classification Search .............. 137/1, 137/101.25, 101.27, 174, 177, 184, 205, 137/391, 571, 209; 73/305, 290 R, 291; 55/428, 429; 210/928
See application file for complete search history.

(56) References Cited

U.S. PATENT DOCUMENTS

| | | | | |
|---|---|---|---|---|
| 611,314 A * | 9/1898 | Cullinan | ..................... | 137/176 |
| 1,327,691 A * | 1/1920 | Ballard | ........................ | 137/174 |
| 2,884,067 A * | 4/1959 | Marken | .................. | 137/101.25 |
| 2,959,055 A * | 11/1960 | True | ........................... | 137/391 |
| 3,765,442 A * | 10/1973 | Nettles et al. | ............... | 137/391 |
| 4,120,656 A * | 10/1978 | Henningsen | ................ | 137/391 |
| 4,259,975 A * | 4/1981 | Kinsey et al. | ................... | 137/1 |
| 4,968,332 A * | 11/1990 | Maher | ........................ | 96/183 |
| 5,148,945 A * | 9/1992 | Geatz | ........................ | 137/205 |
| 5,607,000 A * | 3/1997 | Cripe et al. | ................. | 137/205 |
| 6,568,415 B2 * | 5/2003 | Nakahara et al. | ............... | 137/1 |
| 6,652,495 B1 * | 11/2003 | Walker | ....................... | 604/319 |
| 6,895,816 B2 * | 5/2005 | Streetman | .................... | 73/305 |

* cited by examiner

*Primary Examiner*—Stephen M Hepperle
*Assistant Examiner*—Craig Price
(74) *Attorney, Agent, or Firm*—Shook, Hardy & Bacon L.L.P.

(57) ABSTRACT

A system operating in an environment under a vacuum draw in which liquid accumulates utilizes the weight of the liquid to discharge the liquid from the system. The system includes a first holding tank and a second holding tank interconnected by a liquid passageway and a pressure equalization passageway. A number of valves are provided for controlling flow into and out of the second holding tank. The valves are operated in a sequence to use gravity to bring accumulating liquid from the first holding tank to the second holding tank in the vacuum environment, and then to discharge the liquid from the second holding tank to the environment outside of the system.

9 Claims, 3 Drawing Sheets

SYSTEM FOR LIQUID REMOVAL IN A VACUUM ENVIRONMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Various manufacturing processes involve the large-scale removal of water from a cellulose product to form an end product. Specifically with reference to the paper industry, conventional manufacturing methods utilized involve a variety of steps ultimately designed to reduce the water content of a fiber sheet down to a level where the final paper product will have the desired performance characteristics. For instance, with paper that contains recycled fibers, one process for its manufacture begins with a slurry of cellulose product containing waste corrugated medium and water. As can be understood, virgin fibers may also be used in the slurry, with or without recycled fibers. The slurry is then blended and put through a head box, which applies heat and pressure and lays the resulting intermediate paper product down onto a conveyor screen generally in the form of a continuous sheet. The intermediate paper product may be conveyed through various drying stages where additional heat and air currents are used to drive the moisture out of the product.

At one or more stages of the paper forming process, a vacuum draw may be applied to the intermediate paper product or sheet to aid in moisture extraction. One example of such a stage is when the paper sheet is conveyed over a perforated roller that applies tension to wring the liquid moisture out of the sheet. The moisture is carried away by the vacuum draw into the center of roller and then onto a chamber where the liquid level builds up. Emptying the chamber of the liquid moisture in a vacuum pressure environment generally lower than the pressure of the surrounding ambient environment (e.g., atmospheric pressure) is difficult. The mechanical device drawing the vacuum to carry air or other gases and liquid moisture from the sheet is typically not designed to process the liquids, thus necessitating the intermediate storage chamber for the liquids. At the same time, the liquid cannot build up indefinitely in the chamber, and because the chamber is at negative pressure to the ambient environment, it cannot simply be passively drained. In fact, if too much liquid is maintained in the chamber, it will affect the ability of the vacuum to draw additional moisture out of the paper sheet, leading to variations in the moisture content and weight of the final product, which are undesirable.

One solution for the removal of the accumulating liquid is to utilize a pump (e.g., a centrifugal pump) connected with a liquid outlet of the chamber to pump the liquid to another location outside of the vacuum environment. These pumps, however, are inherently put under significant stress in extracting liquid from a negative relative pressure environment. Common problems encountered in pumping in a vacuum include premature failure of packing and mechanical seals, as well as air locking. Furthermore, such pumping requires a significant amount of energy, which increases the cost of the paper manufacturing process. In view of these disadvantages, a vacuum system could be implemented to draw in both gases and liquid. Such vacuum systems are more complex than a vacuum system that merely handles gases, though, and also require significantly more energy to operate.

SUMMARY OF THE INVENTION

A system is provided that utilizes the weight of accumulating liquid in a storage container to act as a substantial force for removal of such liquid from a vacuum environment containing liquids and gases such as water and atmospheric air. In this arrangement, the system of the present invention can eliminate the need to use conventional pumps that are driven to move liquid against vacuum pressure.

In one aspect, the system enables the removal of liquid accumulating in a first holding tank in a vacuum environment through the use of a second holding tank interconnected with the first holding tank by a liquid passageway and an equalization passageway, and having first, second, third and fourth valves controlling flow into and out of the second holding tank. The first holding tank has a main inlet for receiving a combined flow of a liquid and a gas, a pressure equalization vent, an intermediate liquid outlet and a vacuum outlet. The second holding tank has a liquid inlet connected with the intermediate liquid outlet of the first holding tank by the liquid passageway, a first pressure equalization vent connected with the pressure equalization vent of the first holding tank by the equalization passageway, a second pressure equalization vent adapted for airflow communication with an environment outside the first holding tank and the second holding tank that presents greater air pressure than the vacuum environment, and a liquid discharge outlet. The first valve is coupled with the liquid passageway for controlling the flow of liquid there through, and the second valve is coupled with the equalization passageway for controlling the pressure equalization between the first holding tank and the second holding tank. Working with the second equalization vent is the third valve, which controls pressure equalization between the second holding tank and the environment outside the first holding tank and the second holding tank. Similarly, the fourth valve works with the liquid discharge outlet to control the flow of liquid out of the second holding tank to a location outside of the first holding tank and the second holding tank.

As liquid is accumulating in the first holding tank from the combined flow of liquid and gas, the first and second valves open to allow the liquid to flow into the second holding tank and the pressure within the second holding tank to move towards the pressure value within the first storage tank. For instance, because of the vacuum draw through the first storage tank, the pressure value is generally less than atmospheric pressure. Once the liquid has reached a certain level within the storage tank, a discharge sequence is initiated by closing the first and second valves and opening the third and fourth valves. The third valve allows the pressure within the second storage tank to move towards the pressure valve of the environment outside of the holding tanks so that liquid flowing through the fourth valve to the outside environment may leave the system freely. Upon the liquid level dropping an acceptable amount, the third and fourth valves close and the first and second valves open for another second holding tank filling sequence.

The system may also be provided with a measurement device that indicates the level of liquid within the second holding tank. The measurement device is coupled with at least one switch to control operation of the first valve, the second valve, the third valve and the fourth valve in response to the level of liquid within the second holding tank and thereby accomplish liquid removal from the system.

With the system of the present invention, significant energy savings can be realized in processes where a liquid is drawn out of a manufactured product utilizing vacuum pressure. Because the level of accumulating liquid in the first holding tank can also be regulated, liquid can more efficiently be brought into the tank through the main inlet, lowering the humidity level upstream of the main inlet. As one example, it is desirable to transfer a large amount of moisture away from continuous paper sheeting upstream of the main inlet, which may be aided by such reduced humidity levels. Additional advantages and novel features of the present invention will in part be set forth in the description that follows or become apparent to those who consider the attached figures or practice the invention.

BRIEF DESCRIPTION OF THE SEVERAL VIEWS OF THE DRAWINGS

In the accompanying drawings, which form a part of the specification and are to be read in conjunction therewith and in which like reference numerals are employed to indicate like parts in the various views.

DETAILED DESCRIPTION OF THE INVENTION

Figure 1:
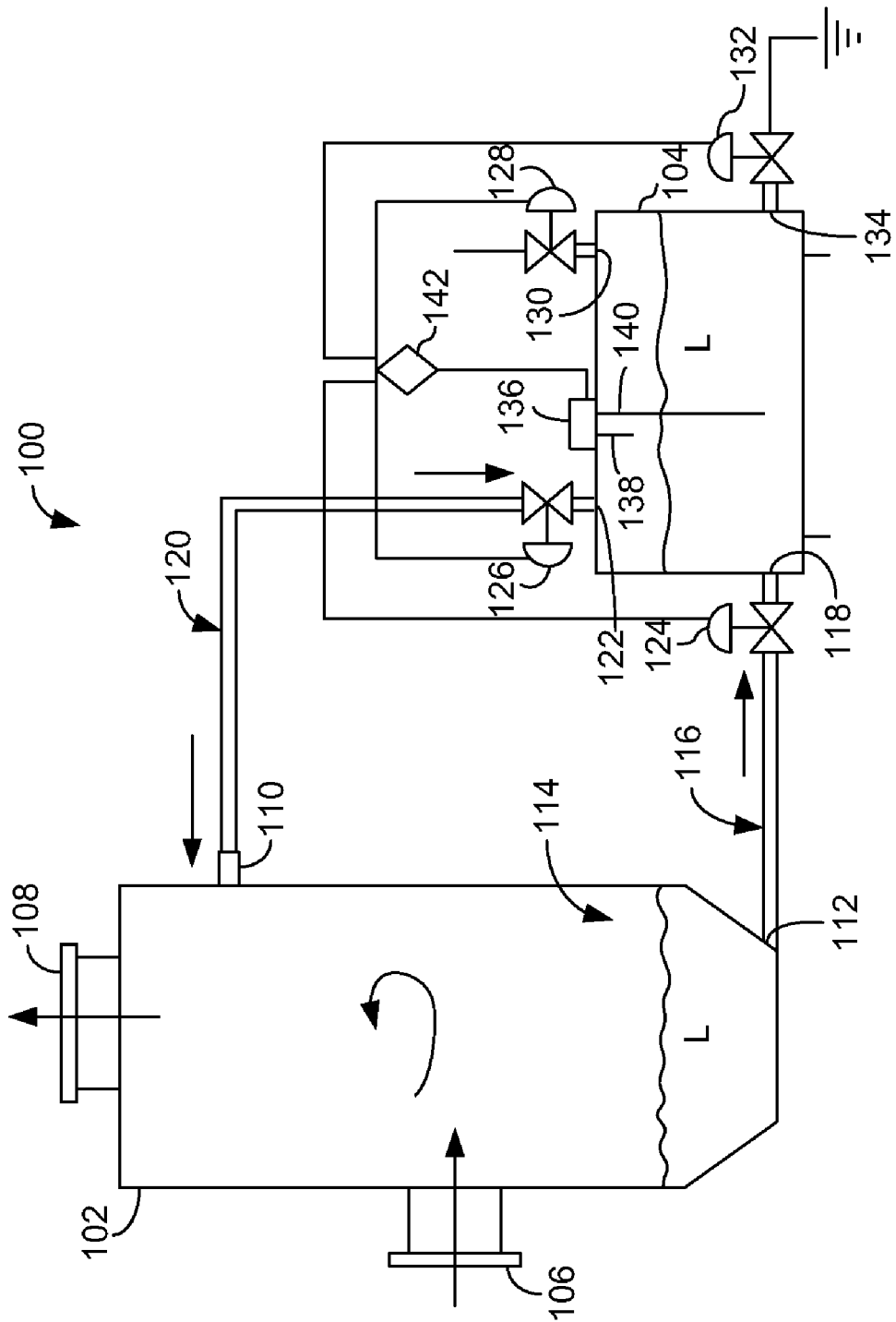
FIG. 1 is a schematic view of the system for removing accumulating liquid in a vacuum environment undergoing a tank filling sequence.
Figure 2:
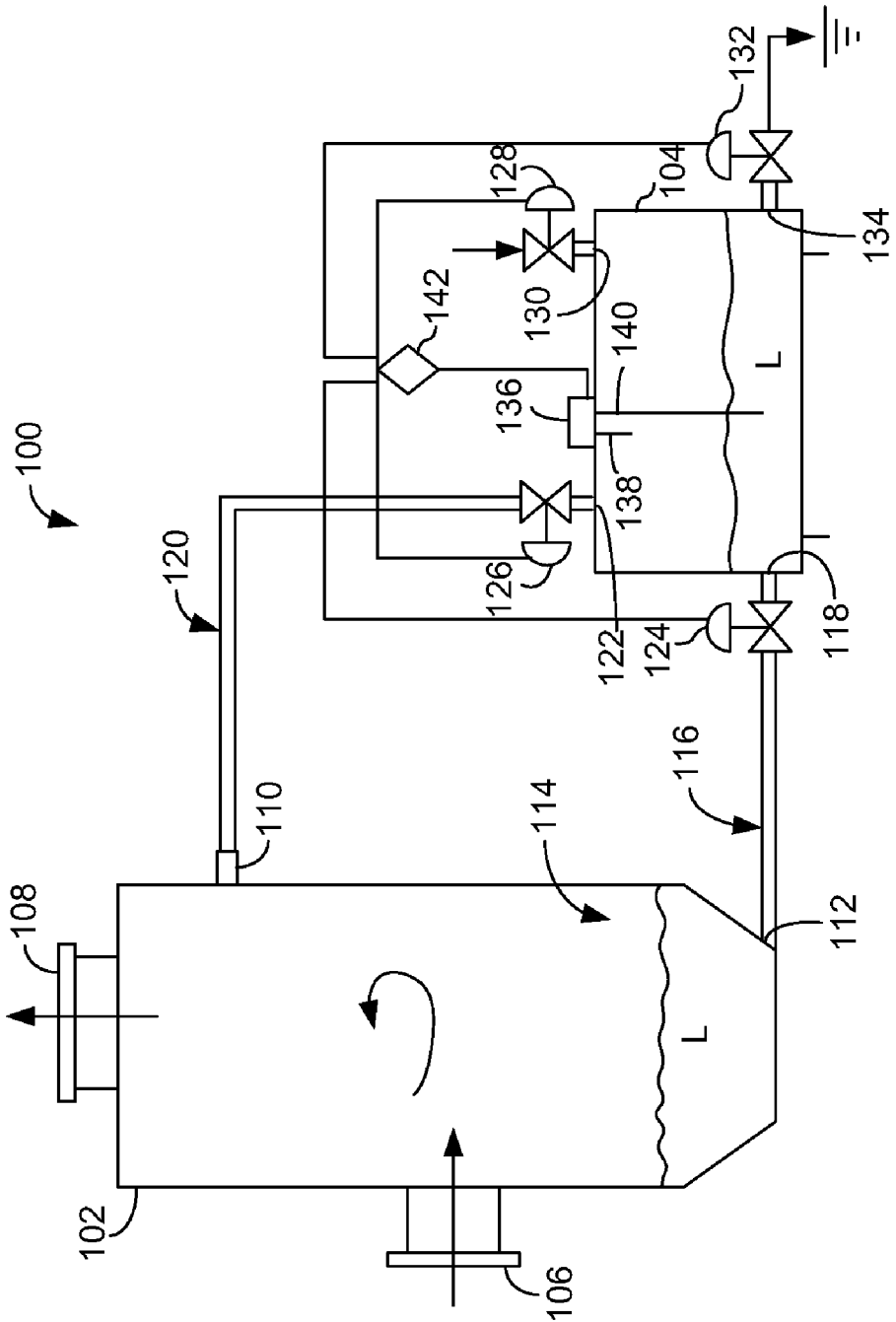
FIG. 2 is another schematic view of the system for removing accumulating liquid in a vacuum environment where the system is undergoing a tank discharge sequence.

A system that receives a combined flow of a liquid and a gas in a vacuum environment, and accomplishes discharging of the liquid as it accumulates, is illustrated in FIGS. 1 and 2, and is denoted by the reference numeral 100. By the specific arrangement of the present invention, the system 100 can utilize substantially or wholly the weight of accumulating liquid L as the driving force to move such liquid out of a first holding tank 102 and a second holding tank 104 of the system 100. The system 100 reduces or eliminates the need for pumps and other mechanical means to drive accumulating liquid out of a vacuum environment where the air pressure is a lower value that the air pressure in the surrounding environment outside of the system 100 which receives the discharged liquid. As an example, the surrounding environment may be a general room or outdoor environment at atmospheric air pressure. Additionally, it should be understood that the vacuum environment of the system may also be referred to herein as a "negative relative air pressure" environment. FIG. 1 depicts a filling sequence for the second holding tank 104 and FIG. 2 depicts a discharge sequence for the second holding tank 104.

The first holding tank 102 has a main inlet 106 that receives a combined flow of a liquid and a gas, a vacuum outlet 108 for the flow of the gas out of the first holding tank 102 under a vacuum draw, a pressure equalization vent 110, and an intermediate liquid outlet 112. In one example of use, the main inlet 106 may be connected with a conduit leading to one or more perforated rollers which support a continuous paper sheeting passing over the rollers to draw moisture out of the sheeting during paper manufacture. The rollers may be configured to provide tension on the sheeting to wring the moisture out of the sheeting, or may rely more on the vacuum draw on the sheeting to bring out the moisture as it passes over the rollers. In any case, the vacuum draw will pull the liquid moisture and a flow of air (as one or more gases) into the first holding tank 102 through the main inlet 106. At this stage, the liquid falls into a receiving portion 114 of the tank 102 where it becomes accumulating liquid L, while the air is pulled through the vacuum outlet 108. The vacuum draw may be provided downstream of the vacuum outlet 108 by various mechanical means, as those of skill in the art should appreciate.

A liquid passageway 116 extends from the intermediate liquid outlet 112 to a liquid inlet 118 of the second holding tank 104 to bring the accumulating liquid L from the first holding tank 102 to the second holding tank 104, as depicted in the FIG. 1. Because of the negative relative air pressure environment within the first holding tank 102, the air pressure value within the second holding tank 104 must be lowered to approach the air pressure value within the first holding tank 102 in order for the liquid to flow freely under the force of gravity through the liquid passageway 116 from the first tank 102 to the second tank 104. Therefore, an equalization passageway 120 extends from the pressure equalization vent 110 of the first holding tank 102 to a first pressure equalization vent 122 of the second holding tank 104. This allows the air pressure within the second tank 104 to equalize, more or less, with the first tank 102, and the level of the accumulating liquid L to be generally at about the same elevation or height in both tanks. A liquid transfer valve, or first valve 124, is positioned within the liquid passageway 116 to regulate the liquid flow between the first and second tanks 102 and 104, and a vacuum equalization valve, or second valve 126, is positioned within the equalization passageway 120 to regulate air pressure equalization between the first and second tanks 102 and 104. Both of the first and second valves 124 and 126 are opened during the tank filling sequence where liquid travels freely from the first tank 102 to the second tank 104. The second holding tank 104 also includes a atmospheric equalization valve, or third valve 128, coupled with a second pressure equalization vent 130 and a liquid discharge valve, or fourth valve 132, coupled with a liquid discharge outlet 134. The third valve 128 enables air pressure equalization between the second holding tank 104 and the environment outside of the first and second holding tanks 102 and 104, such as the ambient atmosphere. The fourth valve 132 regulates liquid flow out of the second holding tank 104 to the outside environment. Both of the third and fourth valves 128 and 132 are closed during the tank filling sequence.

Eventually it becomes necessary to shut off the flow of liquid through the liquid passageway 116 into the tank 104 and to empty at least some of the liquid from the tank 104. This may be due to, for instance, (a) the second holding tank 104 filling up, or (b) the level of accumulating liquid L in the first holding tank 102 approaching a maximum desired elevation (e.g., the elevation of the lowermost point of the main inlet 106). At this point, the first and second valves 124 and 126 are closed to prevent liquid flow through the liquid passageway 116 and pressure equalization between the first and second holding tanks 102 and 104. The third and fourth valves 128, 132 are then opened to begin a discharge sequence. This allows air flow through the second pressure equalization vent 130 to raise the negative relative air pressure value within the second holding tank 104 to the value of the environment outside of the system 100, thereby enabling the liquid in the second tank 104 at or above the elevation of the liquid discharge outlet 134 to flow by its own weight out of the outlet 134. The liquid discharged from the outlet 134 is no longer in the vacuum environment, and thus can be handled in a conventional fashion (e.g., pumped to a location without having to overcome a vacuum draw). Once a sufficient amount of the liquid is discharged through the liquid discharge outlet 134, the third and fourth valves 128, 132 will close.

The opening of the third and fourth valves 128, 132 is preferably performed no earlier than at the time of closing of the first and second valves 124 and 126 for a number of reasons. First, by not having both the second valve 126 and the third valve 128 open at the same time, excess loading on the vacuum means by drawing ambient air in through a direct open air circuit extending from the second pressure equalization vent 130 through the second tank 104 and the equalization passageway 120 and onto the vacuum outlet 108 is avoided. Secondly, avoiding having the first valve 124 open at the same time as either the third valve 128 and the fourth valve 132 open at the same time prevents backflow of accumulating liquid L from the second tank 104 to the first tank 102 due to the higher ambient air pressures in the surrounding environment outside of the system 100 which receives the discharged liquid.

Figure 3:
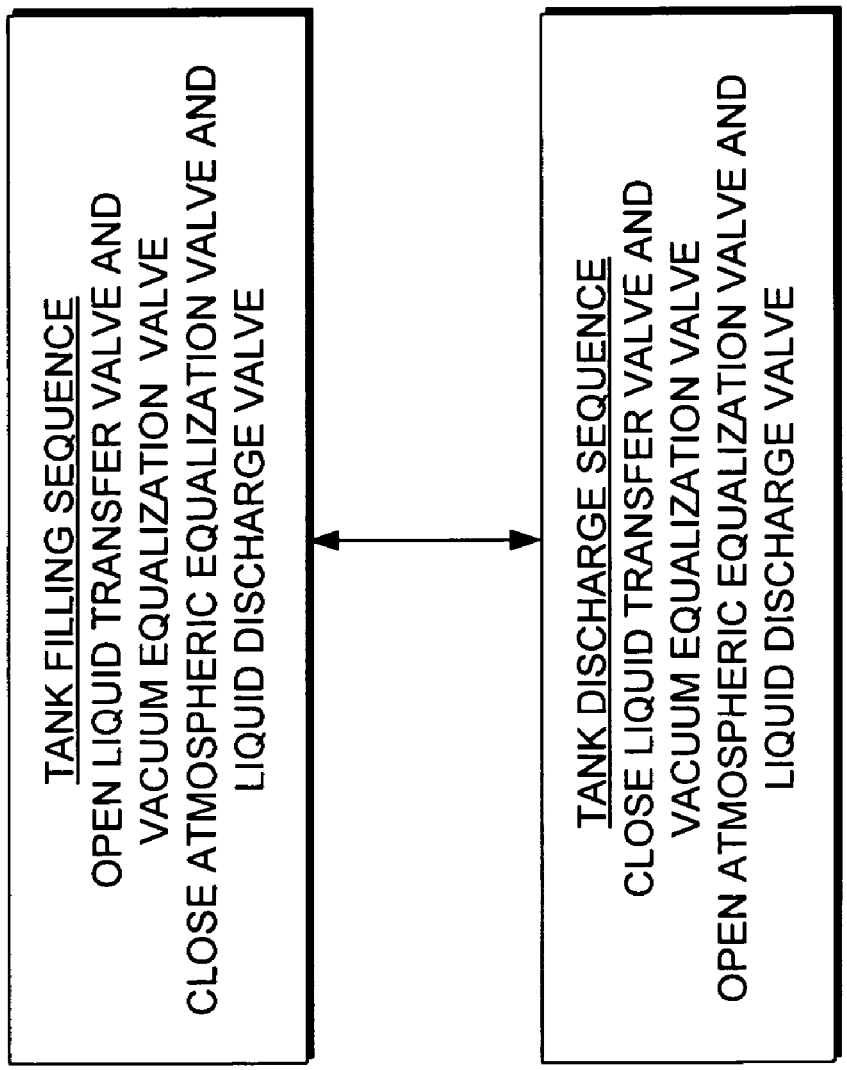
FIG. 3 is a block diagram illustrating the valve conditions that accomplish tank filling sequences and tank discharge sequences for the system.

At the completion of the discharge sequence, the system 100 cycles back to the filling sequence for the second holding tank 104 by reopening the first and second valves 124 and 126. Once again, the air pressure value within the second holding tank 104 is lowered to approach the negative relative air pressure environment induced by the vacuum draw on the first holding tank 102, in order to allow the free flow of the accumulating liquid L from the first holding tank 102 to the second holding tank 104. The state of opening and closing of the various valves 124, 126, 128 and 132 cycling through the filling sequence and discharge sequence for the second holding tank 104 is depicted in FIG. 3. Preferably, the first valve 124 is opened no earlier than at the time of opening of the second valve 126. This prevents backflow of accumulating liquid L through the liquid passageway 116 to the first tank 102 due to the higher air pressure within the second tank 104 at the end of the discharge sequence prior to pressure equalization between the first and second tank 102 and 104 realized when the second valve 126 is opened.

The timing of the tank discharge sequence should take into account the level of liquid accumulation within the first holding tank 102. The first and second valves 124 and 126 preferably should not be closed for such a period of time as to allow the accumulating liquid L in the receiving portion 114 of the tank 102 to reach the elevation of the main inlet 106. Therefore, it is desirable to have automation incorporated into the valve opening and closing sequences so that human error may be eliminated. To that end, a liquid level measurement device 136 may be provided for directing the activity of the valves 124, 126, 128 and 132 in response to measured levels of accumulating liquid L within the second holding tank 104. The measurement device 134 is coupled to the second tank 104, and may take the form of an integrated liquid level control apparatus, such as conductivity-based measurement device employing various sensors and controls. One suitable measurement device 136 is the WARRICK conductivity-based liquid level control offered by Gems Sensors, Inc. of Plainville, Conn. The measurement device 136 has a pair of probes 138 and 140 that extend downwardly into the accumulating liquid L in the second tank 104. The length of the probes 138 and 140 are selected to initiate a discharge sequence when the level of liquid rises to the terminal end of the shorter probe 138, or discharge trigger point, and a filling sequence when the level of liquid falls to the terminal end of the longer probe 140, or filling trigger point. The liquid is used by the probes 138 and 140 of the conductivity-based measurement device 134 to complete an electrical circuit and cause a control relay to actuate. This actuation takes place at the discharge trigger point and at the filling trigger point. More specifically, at the discharge trigger point, the measurement device 136 sends signals to the first and second valves 124 and 126 to cause such valves to close and to the third and fourth valves 128 and 132 to cause such valves to open. Conversely, at the filling trigger point, the measurement device 136 sends signals to the third and fourth valves 128 and 132 to cause such valves to close and to the first and second valves 124 and 126 to cause such valves to open. The valves 124, 126, 128 and 132, as one suitable arrangement, may be solenoid valves receiving the signals from the measurement device 136. However, it should be appreciated that other electrical and/or mechanical means may be utilized for valve opening and closing.

If desired, a pump (not shown), such as a centrifugal pump, may be connected with the liquid discharge outlet 134 of the second holding tank 104, or at another point in the system 100 where the pump handles the accumulating liquid L. This arrangement speeds up liquid removal from the second holding tank 104 while liquid accumulates in the first holding tank 102. In particular, the use of such a pump downstream of the first valve 124 may be advantageous during the tank discharge sequence when the second holding tank 104 is at ambient air pressure and the pump does not have to work against a vacuum draw. In another embodiment, the equalization passageway 120 may extend from the first pressure equalization vent 122 of the second holding tank 104 to a location in the vacuum system other than the first holding tank 102, so long as pressure equalization can more or less be achieved between the first and second tanks 102 and 104.

As can be seen, the configuration of the system 100 of the present invention provides improved reliability and effectiveness in systems that remove accumulating liquid from a vacuum environment. Since certain changes may be made in the above invention without departing from the scope hereof, it is intended that all matter contained in the above description or shown in the accompanying drawing be interpreted as illustrative and not in a limiting sense. It is also to be understood that the following claims are to cover certain generic and specific features described herein.

What is claimed is:

1. A system for removing accumulating liquid from a vacuum environment utilizing the weight of the liquid, comprising:

a first holding tank having a main inlet for receiving a combined flow of a liquid and a gas, a pressure equalization vent, an intermediate liquid outlet and a vacuum outlet that facilitates the combined flow of said liquid and said gas through the main inlet;

a second holding tank having a liquid inlet connected with the intermediate liquid outlet of the first holding tank, a first pressure equalization vent connected with the pressure equalization vent of the first holding tank, a second pressure equalization vent adapted for airflow communication with an environment outside the first holding tank and the second holding tank that presents greater air pressure than the vacuum environment, and a liquid discharge outlet;

a liquid passageway interconnecting the intermediate liquid outlet of the first holding tank and the liquid inlet of the second holding tank, wherein the liquid passageway allows the liquid to flow freely under the force of gravity from the first holding tank to the second holding tank;

an equalization passageway interconnecting the pressure equalization vent of the first holding tank and the first pressure equalization vent of the second holding tank;

a first valve coupled with the liquid passageway for controlling the flow of liquid there through;
a second valve coupled with the equalization passageway for controlling the pressure equalization between the first holding tank and the second holding tank;
a third valve controlling pressure equalization between the second holding tank and the environment outside the first holding tank and the second holding tank through the second pressure equalization vent; and
a fourth valve controlling the flow of liquid out of the liquid discharge outlet to a location outside of the first holding tank and the second holding tank.

2. The system of claim 1, further comprising a measurement device indicating the level of liquid within the second holding tank.

3. The system of claim 2, further comprising at least one switch coupled with the measurement device to control operation of the first valve, the second valve, the third valve and the fourth valve in response to the level of liquid within the second holding tank.

4. The system of claim 3, wherein the first valve, the second valve, the third valve and the fourth valve are solenoid valves.

5. The system of claim 3, wherein the at least one switch provides coordinated opening of the liquid inlet and first pressure equalization vent of the second holding tank corresponding with coordinated closing of the second pressure equalization vent and liquid discharge outlet of the second holding tank, as well as coordinated closing of the liquid inlet and first pressure equalization vent of the second holding tank corresponding with coordinated opening of the second pressure equalization vent and liquid discharge outlet of the second holding tank.

6. The system of claim 1, wherein the liquid discharge outlet of the second holding tank is at an elevation below the elevation of the main inlet of the first holding tank.

7. A process for removing accumulating liquid from a vacuum Environment utilizing the weight of the liquid, comprising the steps of:
providing a first holding tank having a main inlet, a pressure equalization vent, an intermediate liquid outlet and a vacuum outlet;
providing a second holding tank having a liquid inlet connected with the intermediate liquid outlet of the first holding tank through a liquid passageway, a first pressure equalization vent connected with the pressure equalization vent of the first holding tank through an equalization passageway, a second pressure equalization vent adapted for airflow communication with an environment outside the first holding tank and the second holding tank that presents greater air pressure than the vacuum environment, and a liquid discharge outlet;
providing a first valve regulating liquid flow through the liquid passageway, a second valve regulating air flow through the equalization passageway, a third valve regulating air flow through the second pressure equalization vent, and a fourth valve regulating liquid flow through the liquid discharge outlet;
applying a vacuum to the vacuum outlet to draw a combined flow of a liquid and a gas through the main inlet into the first holding tank;
opening the first valve and the second valve to allow liquid to flow at least substantially by gravity into the second holding tank and move the air pressure value within the second holding tank towards the air pressure value within the first holding tank;
closing the first valve and the second valve when the level of liquid within the second holding tank reaches a first predetermined level; and
opening the third valve and the fourth valve to discharge the liquid within the second holding tank to a location outside of the first holding tank and the second holding tank and move the air pressure value within the second holding tank towards the air pressure value of the environment outside the first holding tank and the second holding tank.

8. The process of claim 7, further comprising the steps of:
closing the third valve and the fourth valve when the level of liquid within the second holding tank reaches a second predetermined level; and
reopening the first valve and the second valve to allow liquid to flow at least substantially by gravity into the second holding tank and move the air pressure value within the second holding tank towards the air pressure value within the first holding tank.

9. A liquid removal system operating within a vacuum environment, comprising:
a first holding tank and a second holding tank interconnected by a liquid passageway, the first holding tank having a main inlet for receiving a combined flow of a liquid and a gas, an intermediate liquid outlet and a vacuum outlet, the second holding tank having a liquid inlet, a first and a second pressure equalization vent, and a liquid discharge outlet, wherein the liquid passageway interconnects the intermediate liquid outlet of the first holding tank to the liquid inlet of the second holding tank;
a first valve coupled with the liquid passageway for controlling the flow of liquid from the first holding tank to the second holding tank;
a second valve controlling pressure equalization between the second holding tank and the vacuum environment through the first pressure equalization outlet;
a third valve controlling pressure equalization between the second holding tank and the environment outside the first holding tank and the second holding tank through the second pressure equalization outlet; and
a fourth valve controlling the flow of liquid out of the liquid discharge outlet to a location outside of the first holding tank and the second holding tank;
wherein the liquid discharge outlet is at a lower elevation relative to the main inlet so that liquid flow from the first holding tank to the second holding tank and out of the liquid discharge outlet may be influenced by gravity, and wherein the first holding tank has a pressure equalization vent interconnected with the first pressure equalization vent of the second holding tank by equalization passageway, the second valve being disposed within the equalization passageway.

* * * * *